(No Model.) 2 Sheets—Sheet 2.

W. S. MOSES & O. ANDREWS.
MACHINE FOR CUTTING BLOCKS OF FISH INTO LAYERS.

No. 317,469. Patented May 5, 1885.

WITNESSES.
J. M. Hartnett.
L. B. W. Williams

INVENTOR.
Walter S. Moses
Oscar Andrews
By their atty.,
Henry W. Williams

UNITED STATES PATENT OFFICE.

WALTER S. MOSES AND OSCAR ANDREWS, OF GLOUCESTER, MASS., ASSIGN-ORS OF ONE-HALF TO SAID MOSES AND JOSEPH H. ANDREWS, OF SAME PLACE, AND GEORGE TUCKER, OF ROCKPORT, MASS.

MACHINE FOR CUTTING BLOCKS OF FISH INTO LAYERS.

SPECIFICATION forming part of Letters Patent No. 317,469, dated May 5, 1885.

Application filed December 1, 1884. (No model.)

*To all whom it may concern:*

Be it known that we, WALTER S. MOSES and OSCAR ANDREWS, of Gloucester, in the county of Essex and State of Massachusetts, have invented a new and Improved Machine for Cutting Blocks of Fish into Layers, of which the following is a specification.

Blocks or pieces of fish having been cut from the fish by means of suitable machinery, it is the object of this invention to cut these blocks horizontally so as to provide suitable layers to be applied to the tops and bottoms of blocks of fish, whereby said blocks may be made acceptable to the market.

Figure 1:
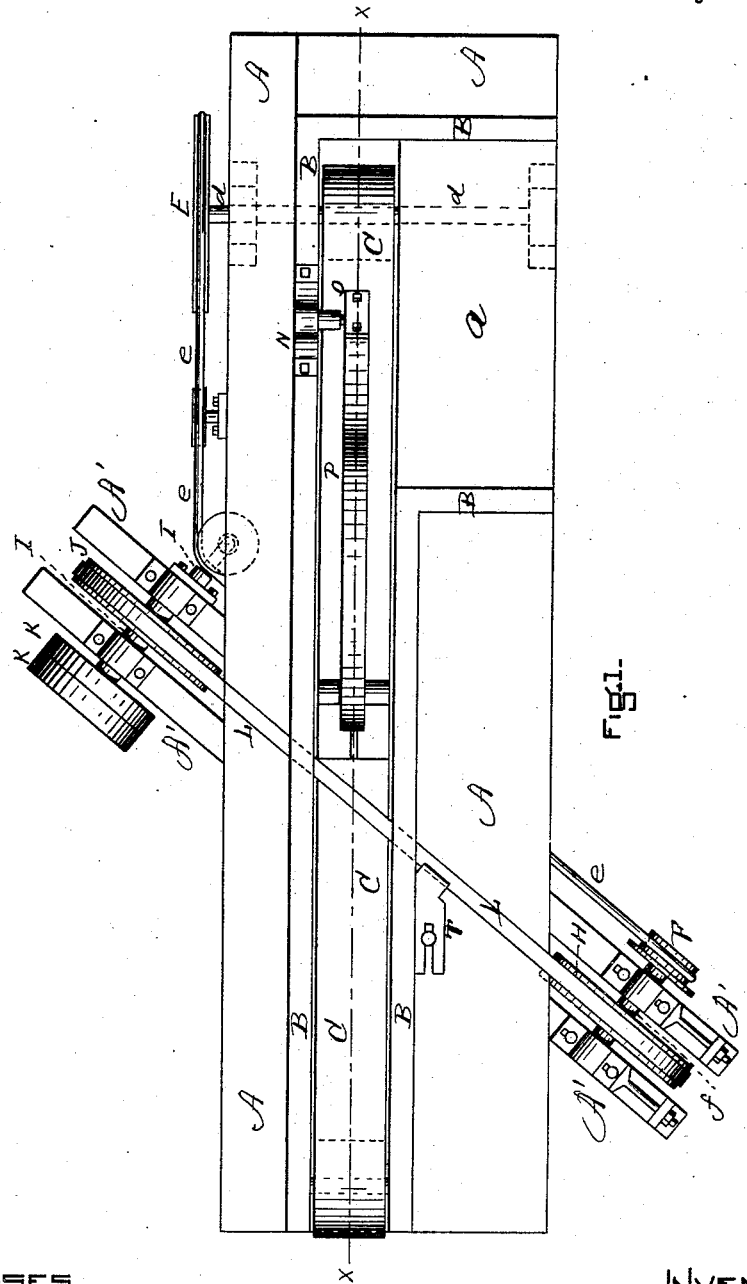
Figure 2:
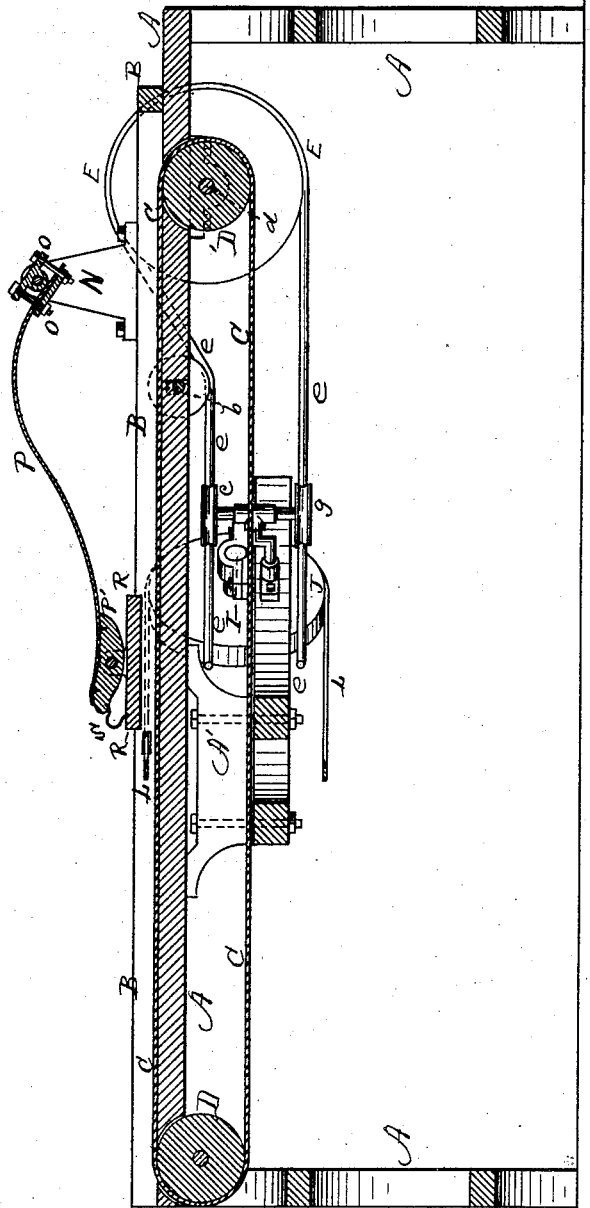

In the accompanying drawings, in which similar letters of reference indicate like parts, Figure 1 is a plan view of a machine embodying our invention. Fig. 2 is a longitudinal vertical section of the same on line $x$ $x$, Fig. 1.

A is the frame, provided on its upper side with the ribs or partitions B, which serve the double purpose of flanking the belt and inclosing a place, $a$, which we term a "table," for holding the cakes of fish ready to be operated upon. C is an endless belt passing over the pulleys D D′, in the position shown, over and under the flat portion of the frame, and between the partitions B. The pulley D is a loose pulley, and the pulley D′ is fast on the shaft $d$, to which is also fixed the driving-pulley E, connected by a belt, $e$, with the pulley F, said belt being conducted by the intermediate pulleys, $b\ c\ g$, and all such pulleys being supported by the frame A, as shown. The pulley F is fast on the shaft $f$, supported by the frame A′, secured to the frame A, and said shaft is provided with the fast pulley H, and the frame A′ is provided on the opposite side diagonally of the frame A with a shaft, I, having the belt-pulley J, and the ordinary fast-and-loose pulleys K K, whereby power is communicated to the machine. The pulleys J and H are connected by an endless cutting-knife, L, serving also the purpose of a belt for communicating motion. This knife or cutting-ribbon extends and runs diagonally over the belt at a distance above it equivalent to the thickness of the slice or layer desired to be cut from the block of fish. The blocks of fish, which are usually rectangular in shape, are pushed by the operator upon the belt C, (which runs toward the cutting-ribbon), and are carried by said belt between the partitions B to the cutting-ribbon L, which, owing to its diagonal position, makes a clean horizontal cut and produces an even layer or slice.

In order that the block of fish may be held to the knife without jumping or moving relatively to the belt C, the frame A is provided with a standard, N, on which is pivoted "friction tight" a frame, O, supporting a spring, P, having at its free end a block, P′, to which is pivoted a presser-block, R, adapted to press down the blocks of fish as they approach the knife. In order to prevent the rear end of the presser-block from striking the fish as it approaches a spring, S, keeps the front end normally lowered.

The guide T serves to regulate and adjust the position of the endless knife.

Having thus fully described our invention, what we claim, and desire to secure by Letters Patent, is—

1. In a machine for cutting fish, the combination, with an endless belt for carrying the fish to the cutter, of an endless knife or cutting-ribbon arranged to pass diagonally over the said belt and cut the approaching fish into layers or slices, substantially as and for the purpose set forth.

2. In a machine for cutting fish, the combination of the frame A, provided with the pulleys D D′ E $b\ c\ g$, belt $e$, and carrying-belt C, and the frame A′, provided with the shafts $f$ I, pulleys F H J, and cutting-ribbon L, arranged substantially as and for the purpose described.

3. In a machine for cutting fish, the combination of the frame A, provided with the partitions B, the horizontal endless belt C, and the diagonal cutting-ribbon L, substantially as and for the purpose set forth.

4. In a machine for cutting fish, the combination, with the frame, endless carrying-belt C, and cutting-ribbon L, of the standard N, spring P, and presser-block R, substantially as and for the purpose described.

5. In a machine for cutting fish, the combination, with the frame, endless carrying-belt C, and cutting-ribbon L, of the standard N, friction-tight frame O, spring P, block P', pivoted presser-block R, and spring S, all arranged and constructed substantially as and for the purpose set forth.

WALTER S. MOSES.
OSCAR ANDREWS.

Witnesses:
SIDNEY GARDNER,
WM. H. SARGENT.